United States Patent
Wells et al.

(10) Patent No.: US 11,048,312 B2
(45) Date of Patent: Jun. 29, 2021

(54) SYSTEMS AND METHODS FOR MANAGING REDUCED POWER FAILURE ENERGY REQUIREMENTS ON A SOLID STATE DRIVE

(71) Applicant: Toshiba Memory Corporation, Tokyo (JP)

(72) Inventors: Steven Wells, Sacramento, CA (US); Robert Reed, El Dorado Hills, CA (US)

(73) Assignee: Toshiba Memory Corporation, Tokyo (JP)

( * ) Notice: Subject to any disclaimer, the term of this patent is extended or adjusted under 35 U.S.C. 154(b) by 102 days.

(21) Appl. No.: 16/274,755

(22) Filed: Feb. 13, 2019

(65) Prior Publication Data

US 2020/0257346 A1 Aug. 13, 2020

(51) Int. Cl.
| | |
|---|---|
| *G06F 1/30* | (2006.01) |
| *G06F 1/3225* | (2019.01) |
| *G06F 9/30* | (2018.01) |
| *G06F 11/20* | (2006.01) |
| *G06F 11/30* | (2006.01) |
| *H02J 9/06* | (2006.01) |

(52) U.S. Cl.
CPC .............. *G06F 1/30* (2013.01); *G06F 1/3225* (2013.01); *G06F 9/3004* (2013.01); *G06F 11/2015* (2013.01); *G06F 11/3034* (2013.01); *H02J 9/06* (2013.01)

(58) Field of Classification Search
CPC ...... G06F 1/30; G06F 9/3004; G06F 11/3034; G06F 11/2015; H02J 9/06
USPC ............................................... 714/24
See application file for complete search history.

(56) References Cited

U.S. PATENT DOCUMENTS

| | | | |
|---|---|---|---|
| 10,474,532 B1 * | 11/2019 | Roy | G06F 11/1415 |
| 2005/0185472 A1 * | 8/2005 | Randell | G06F 12/0893 |
| | | | 365/185.33 |
| 2006/0072369 A1 * | 4/2006 | Madter | G11C 11/4074 |
| | | | 365/232 |
| 2019/0243578 A1 * | 8/2019 | Thompson | G06F 3/068 |

* cited by examiner

*Primary Examiner* — Yair Leibovich
(74) *Attorney, Agent, or Firm* — White & Case LLP

(57) ABSTRACT

A system and method for controlling a SSD in response to a power failure event of a main power supply to the SSD. The method includes receiving and storing write commands and associated data payloads for execution on the SSD in volatile memory, detecting the power failure event on the SSD, supplying backup power to the SSD during the power failure event, and executing one or more write commands stored in the volatile memory by storing the associated data payloads in a non-volatile memory on the SSD using the backup power. In response to the execution, removing the one or more write commands from the cache such that one or more unexecuted write commands and the associated data payloads remain in the cache, and storing a list of the one or more unexecuted write commands, but not the associated data payloads, in non-volatile memory using the backup power.

19 Claims, 4 Drawing Sheets

SYSTEMS AND METHODS FOR MANAGING REDUCED POWER FAILURE ENERGY REQUIREMENTS ON A SOLID STATE DRIVE

FIELD OF THE INVENTION

The invention relates generally to solid state memory drives and more particularly to systems and methods for managing reduced power fail energy requirements on a solid state drive.

BACKGROUND

Non-volatile memory (NVM) is a type of computer memory that retains stored information even after power cycling-powering a device off and then on again. In contrast, volatile memory is a type of computer memory that requires power to maintain the stored information-when the power is off or interrupted, the stored data is lost. A traditional type of non-volatile memory is a hard disk drive (HDD), which stores and accesses data using one or more rotating disks (platters) coated with magnetic material.

Another type of storage memory is a solid state drive (SSD), which differs from a HDD in that digital data is stored and retrieved using electronic circuits, without any moving mechanical parts. SSDs can be used based on both volatile memory, such as dynamic random access memory (DRAM) or static random access memory (SRAM), or non-volatile memory, such as NAND flash memory. SSDs with NAND flash memory have been widely adopted for use in consumer products and in enterprise data centers.

A typical SSD includes a memory controller and a number of NAND flash memory devices. The memory controller communicates with a host through the host interface on one side and with the NAND flash memory devices through multiple interfaces, commonly referred to as channels, on the other side. A memory controller accesses multiple NAND flash memory devices through a common shared bus interface (a channel). When the host writes write commands to the SSD, the memory controller receives the write commands, temporarily stores the write commands and associated data payloads in a buffer, or cache, in volatile memory and sends an acknowledgement of the write commands to the host. Each write command is then subsequently processed from the cache, and the data payload corresponding to the write command is stored in non-volatile memory, and the write command is removed from the cache.

However, upon a loss of power to the SSD, write commands and their data payloads that are stored in the cache in volatile memory are at risk of being lost. To combat the potential loss of data in the cache during an unexpected loss of power, SSDs are designed with a backup power source. In previous systems, SSDs have been designed with finite backup power sources, such as batteries, capacitors or supercapacitors, sized to handle writing all the data payloads corresponding to the write commands in the cache into non-volatile memory. However, in newer SSD systems with higher throughput rates of write commands, sizing the backup power source to handle the higher throughput rates of write commands is challenging; increasing the amount of backup power takes up a larger percentage of the circuit board space on an SSD, and increasing the amount of backup power raises the costs of manufacturing the SSDs. There is a need for systems and methods for managing reduced power failure energy requirements on a solid state drive for systems with a high write command throughput rate and a reduced backup power source sized for a smaller cache, such that no data in the cache is lost.

BRIEF DESCRIPTION OF INVENTION

In an aspect, a method for controlling a solid state drive (SSD) in response to a power failure event of a main power supply to the SSD, includes receiving, at a host interface of the SSD, a plurality of write commands and associated data payloads for execution on the SSD. The method also includes storing in a volatile memory on the SSD the plurality of write commands and associated data payloads, detecting the power failure event on the SSD, supplying power to the SSD from a backup power source on the SSD during the power failure event, and executing one or more write commands stored in the volatile memory by storing associated data payloads of the one or more write commands in a non-volatile memory on the SSD using the backup power source during the power failure event. And in response to the execution, removing the one or more write commands from the cache such that one or more unexecuted write commands and the associated data payloads remain in the cache and storing a list of the one or more unexecuted write commands, but not the associated data payloads, in the non-volatile memory on the SSD using the backup power source during the power failure event.

In another aspect, a system for controlling a SSD in response to a power failure event of a main power supply to the SSD includes a controller, a backup power source, configured to supply power to the SSD during the power failure event, a non-volatile memory, a volatile memory, and a host interface. The controller is configured to receive, at the host interface, a plurality of write commands and associated data payloads for execution, store, in a volatile memory, the plurality of write commands and associated data payloads, and detect the power failure event. Following detection of the power failure event, the controller is configured to execute one or more write commands stored in the volatile memory by storing the associated data payloads of the one or more commands in the non-volatile memory. And in response to the execution, the controller is configured to remove the one or more write commands from the volatile memory such that one or more unexecuted write commands and associated data payloads remain in the volatile memory and store a list of the unexecuted one or more write commands, but not the associated data payloads, in the non-volatile memory.

DETAILED DESCRIPTION OF THE INVENTION

Figure 1A:
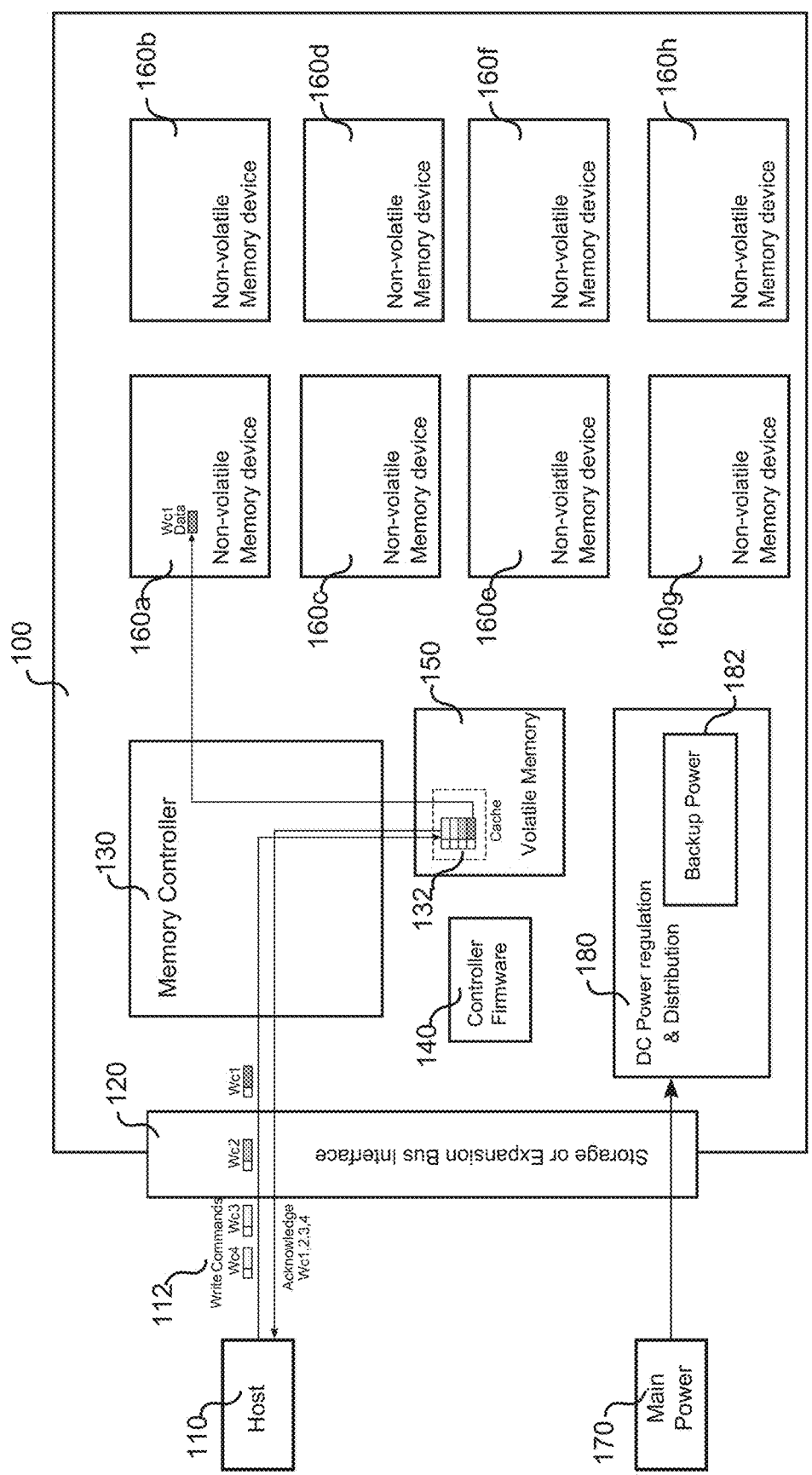
FIG. 1A is a block diagram of a solid state drive before a power failure event.

FIG. 1A is a diagram of a solid state drive 100 before a power failure event, according an embodiment of the invention. Solid state drive 100 includes, but is not limited to, bus interface 120, also known as a host interface 120, which is communicatively coupled to host 110, memory controller 130, controller firmware 140, volatile memory 150 which comprises a cache 132, non-volatile memory devices 160a-h, DC power regulation and distribution 180, and backup power 182.

Host interface 120 enables solid state drive 100 to communicate with host 110. In one embodiment, host interface 120 is a PCIe connector that can be coupled to a PCIe bus (not shown) or an enterprise server or other computing system host using, for example, an NVMe protocol. Other hardware connection types, for example SATA, and SCSI, are within the scope of the invention.

Solid state drive 100 receives power from main power 170, a continuous power source. For example, main power 170 may be a continuous power source supplied by the power grid, a power generator, or any other means that provides a continuous flow of power to solid state drive 100.

FIG. 1A, shows host 110 writing a plurality of write commands 112 (e.g., four write commands: Wc1-Wc4) to solid state drive 100 prior to a power failure event on solid state drive 100. Host 110 transmits a plurality of write commands 112 via host interface 120 to memory controller 130. Memory controller 130 responds with an acknowledgement of the plurality of write commands 112 to host 110 via host interface 120 after receiving the plurality of write commands 112 (e.g., by transmitting an acknowledgement message to host 110). After storing the plurality of write commands 112 in cache 132 in volatile memory 150, memory controller 130 acknowledges the plurality of write commands 112. Once stored in cache 132, each write command in the plurality of write commands 112 is processed, and the data payload corresponding to each write command is stored in one or more locations in non-volatile memory devices 160a-h. After storing all data corresponding to each write command is stored in non-volatile memory devices 160a-h, memory controller 130 removes the write command from cache 132, signifying that the write command has been executed.

For example, host 110 may write four write commands, (e.g., Wc1-Wc4) to solid state drive 100. Memory controller 130 may store the four write commands in cache 132 in volatile memory 150 and respond with an acknowledgement of executing the four write commands from host 110 (with an expectation that the commands will be fully executed and data written to non-volatile memory devices 160a-h shortly thereafter). After the four write commands are stored in cache 132, the first write command, Wc1, may be processed. The Wc1 data payload corresponding to Wc1 may be stored in non-volatile memory device 160a. After storing all the Wc1 data corresponding to the Wc1 write command in non-volatile memory device 160a, the Wc1 write command is removed from cache 132, leaving three write commands stored in cache 132 (e.g., Wc2-Wc4).

Upon solid state drive 100 experiencing a power failure event, whereby main power 170 is disrupted, the remaining three write commands stored in cache 132 (e.g., Wc2-Wc4) are at risk of being lost from due to the power failure. Once solid state drive 100 experiences the loss of power, DC power regulation and distribution 180 detects the power failure following a loss in voltage/current supplied from main power 170, and provides backup power to solid state drive 100 from backup power 182.

In some embodiments, backup power 182 may be comprised of a plurality of capacitors, super capacitors, batteries, or any combination of the above. Conventionally, the backup power supply would be of a sufficient size to execute all commands, or at least all write commands, stored in cache 132. However, in some embodiments, backup power 182 may be reduced and may not have the power capacity to write all the data payloads corresponding to the plurality of write commands stored in cache 132 into non-volatile memory devices 160a-h. For example, backup power 182 may be sized smaller than the write capacity of the write commands stored in cache 132 due to solid state drive 100 board size limitations, costs, or any other limiting factor.

Figure 1B:
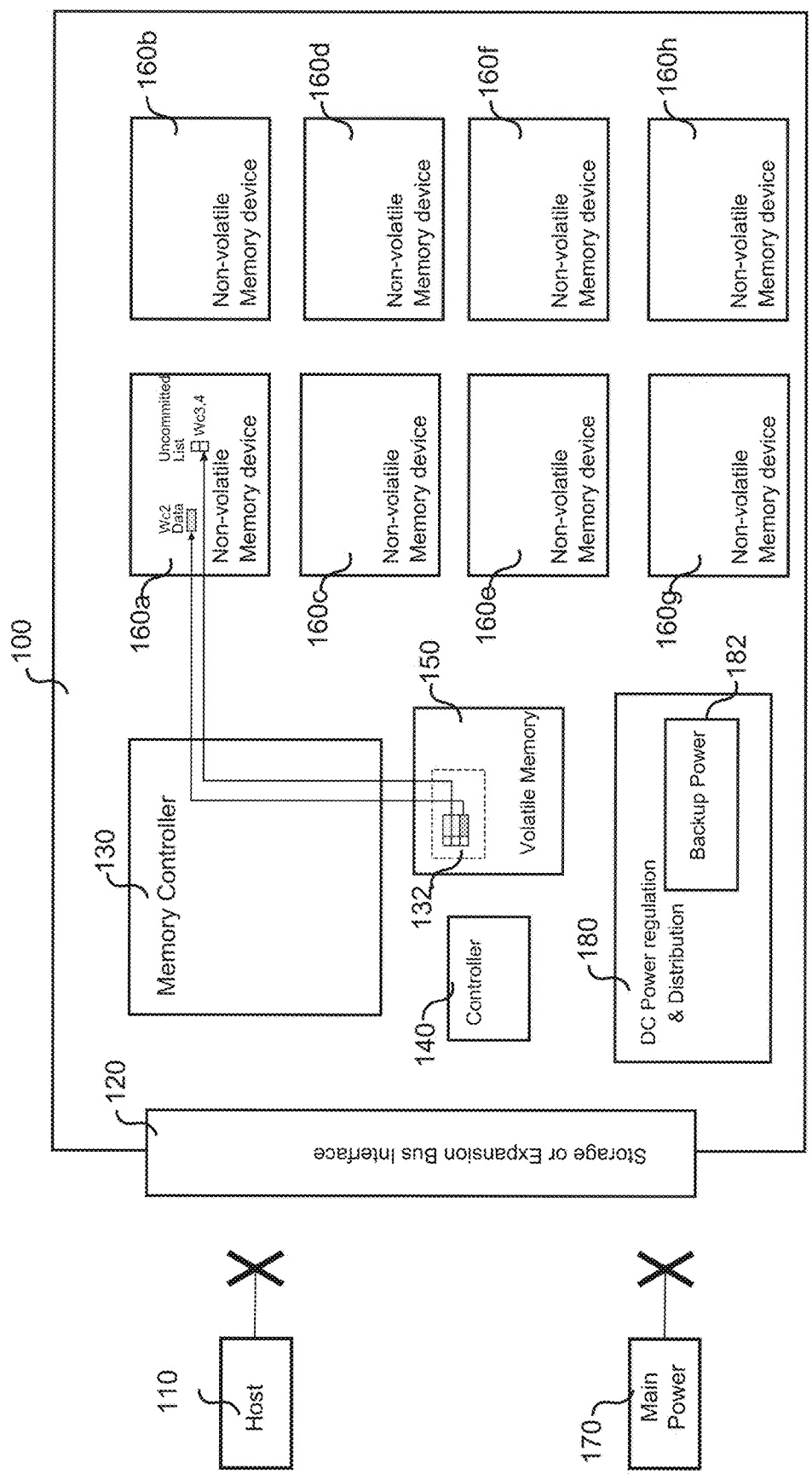
FIG. 1B is a block diagram of a solid state drive during a power failure event.

FIG. 1B illustrates the state of solid state drive 100 of FIG. 1A after a loss of power from main power 170 and an interruption of communication with host 110. In some embodiments, after the loss of power, there are a plurality of unexecuted write commands in the plurality of write commands 112 waiting to be processed in cache 132. With backup power 182 having a reduced power capacity, there may only be sufficient backup power to process, for example, the data corresponding to less than all of the write commands stored in cache 132. For example cache 132 may be sized to handle a high maximum throughput rate of write commands, but may have a reduced backup power 182 that is sized to handle a smaller cache (e.g., a smaller throughput rate of write commands) to reduce the number of power components (e.g., power capacitors) on solid state drive 100's printed circuit board (PCB).

In this regard, memory controller 130 may determine that there is not enough reduced backup power 182 to write the data payloads corresponding to the remaining one or more unexecuted write commands from cache 132 into non-volatile memory devices 160a-h. As such, memory controller 130 may compile a list of the one or more unexecuted write commands in cache 132 that includes parameters about each unexecuted write command, but does not include the data payloads corresponding to each unexecuted write command. For example, the parameters may include, but are not limited to, a destination logical block address, the number of logical blocks of data to be written, a list of destination logical block addresses and numbers of logical blocks of data to be written, and a position in the submission queue in the cache. For example, the parameter data associated with each unexecuted write command may be less than one hundred bytes of data, while the data payloads corresponding to each write command may be ten to a few hundred MBs of data. Therefore, there may be sufficient power from the reduced backup power 182 to write the list of the one or more unexecuted write commands stored in cache 132 into non-volatile memory devices 160a-h, but not the data payloads themselves.

In some embodiments, memory controller 130 may remove a write command from the list of unexecuted write commands once the command has been fully executed (e.g., all the data corresponding to the write command has been written to non-volatile memories 160a-h). For example, if there are six unexecuted write commands in cache 132, and reduced backup power 182 can process three of the unexecuted write commands, controller 130 will initially compile a list of the six unexecuted write commands upon the power failure event, and will remove the successfully executed write command's parameter information from the list of unexecuted write commands when the successfully executed write command is removed from cache 132 (i.e., the list of the parameters of the write commands is kept updated to correspond with the current unexecuted write commands in cache 132).

Controller 130 may monitor the remaining write commands in cache 132 to determine when to curtail the full processing of the unexecuted write commands in cache 132, and save the list of unexecuted write commands (e.g., the parameters associated with the unexecuted write commands)

in non-volatile memory devices 160a-h. In some embodiments, the controller 130 may write the list of unexecuted write commands to non-volatile memory devices 160a-h after it has been compiled, then write to a separate list of executed write commands directly to non-volatile memory devices 160a-h as it successfully executes each command in the unexecuted write commands list. By comparing the unexecuted and executed lists, the controller 130 can determine which commands actually remained unexecuted.

Writing the list of unexecuted write commands to the non-volatile memory devices 160a-h using the backup power 182 allows SSDs to be designed with a reduced amount of power loss protection, while still ensuring that despite the data associated with unexecuted commands in the cache being permanently lost, the controller 130 retains knowledge of which commands remained unexecuted. This advantage allows SSDs to be designed with a smaller PCB footprint. Current backup power systems (e.g., power loss protection systems) take up around 30% of the board area; this area can be significantly reduced when using the described system. Further, the currently described systems and methods reduce the costs associated with implementing backup power systems, as fewer power components are required. They also increase the safety and reliability of SSDs that do not have an adequate amount of backup power (e.g., enough backup power to fully write the data payloads associated with the unexecuted write commands in the cache into non-volatile memory before running out of power). Additionally, the throughput rate of write commands to the cache may be maximized using the current systems and methods, as it is no longer limited by the amount of backup power, making the SSD more efficient.

In some embodiments, controller 130 may monitor the reduced backup power 182 dynamically. For example, controller 130 may retrieve, via a sensor or other comparable measurement means, the amount of backup power available on reduced backup power 182. Controller 130 may determine, once the backup power reaches a certain threshold (e.g., 10% backup power remaining), to stop processing the data payloads corresponding to the one or more unexecuted write commands 112 on cache 132 and write the list of one or more unexecuted write commands to non-volatile memory devices 160a-h. As another example, controller 130 may determine the amount of power required to write the list of write command parameters to the non-volatile memory (e.g., based on the size of the list), and make this amount of power the threshold amount of power.

In some embodiments, the amount of reduced backup power 182 is a pre-set value, calculated based on a power equation associated with the backup power circuitry. For example, if backup power 182 is comprised of capacitors (e.g., or super capacitors), the power may be determined based on the calculated degradation of the capacitors' charge, based on the age of the capacitors, usage, composition, and other relevant parameters.

Controller 130 may further save vital data, such as any unsaved logical to physical map updates, in a list in non-volatile memory devices 160a-h using a portion of the remaining reduced backup power 182. Just prior to reduced backup power 182 running out of its finite supply of power, the physical addresses associated with the logical addresses of the one or more unexecuted write commands in cache 132 may be marked as invalid by memory controller 130 in a logical-to-physical table stored in non-volatile memory devices 160a-h, or, in some embodiments, the controller 130 waits until the resumption of power before reading the list of unexecuted commands from non-volatile memory devices 160a-h and marking the physical addresses associated with these commands as invalid. Therefore, in the event that host 110 attempts to read from the addresses associated with the unexecuted write commands upon resumption of power to solid state drive 100, an invalid address (e.g., an error message) may be returned to host 110.

Figure 1C:
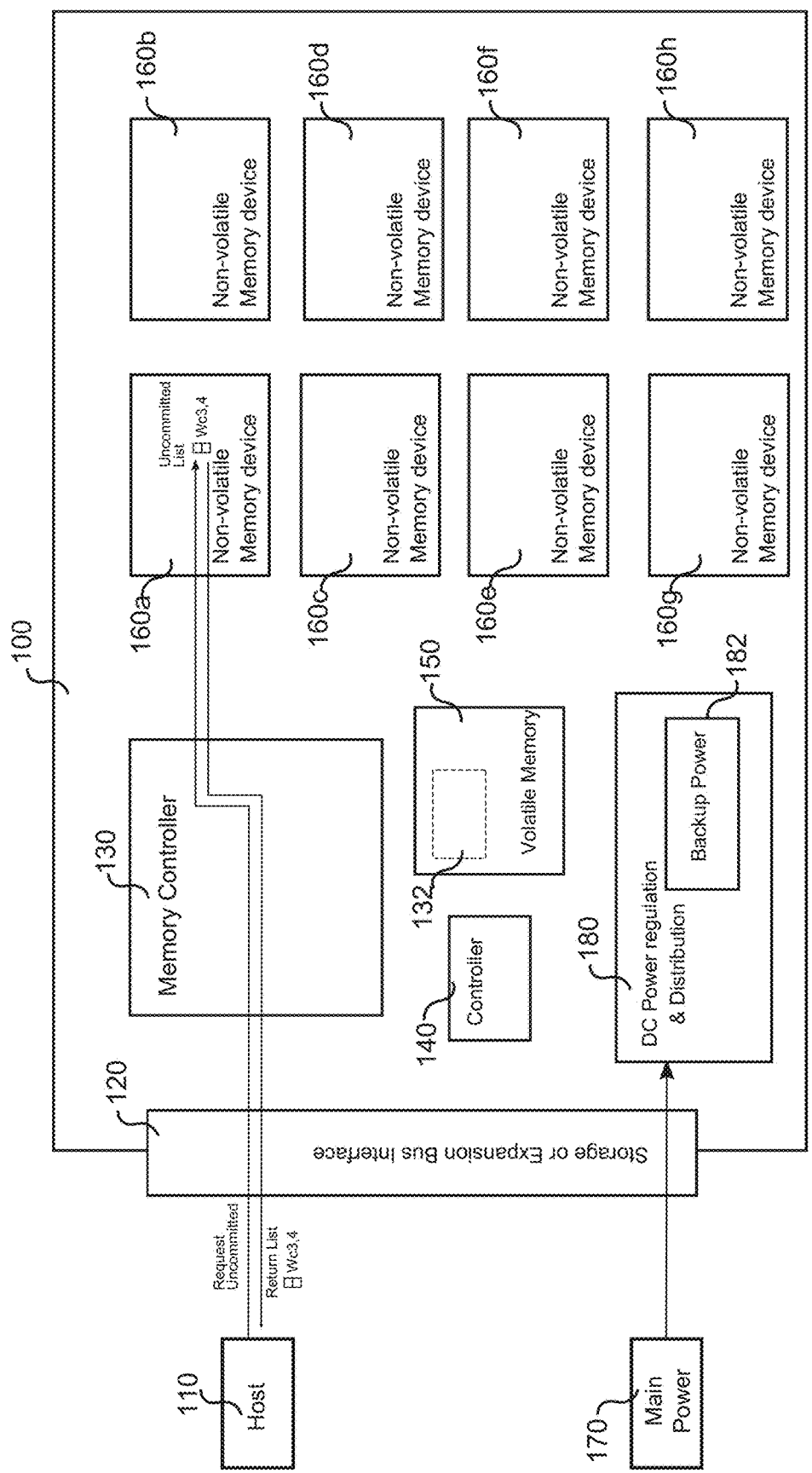
FIG. 1C is a block diagram of a solid state drive after a power failure event.

FIG. 1C shows the state of solid state drive 100 upon the resumption of power and the reestablishment of communication with host interface 120. For example, upon power up of solid state drive 100, host 110 may issue, via host interface 120, a request for the list of any unexecuted (also known as "uncommitted") write commands. Memory controller 130 may retrieve the list of unexecuted write commands stored in non-volatile memory devices 160a-h, and return the retrieved list to host 110 via host interface 120.

In some embodiments, upon power up of solid state drive 100 after the power failure event, memory controller 130 may automatically return the list of unexecuted write commands from non-volatile memory devices 160a-h to host 110 via host interface 120 without a request from host 110 for the list.

In response to receiving the retrieved list of one or more unexecuted write commands, host 110 may act accordingly. For example, in some embodiments, host 110 may request the data payloads corresponding to the unexecuted write commands (e.g., the data payloads that should have been written to non-volatile memory devices 160a-h) from a different redundant storage source. In some embodiments, the different redundant source may be a local redundant storage source (e.g., a local SSD), a remote redundant storage source (e.g., a remote SSD), or a combination of the two.

In some embodiments, host 110 may reconstruct the data payloads corresponding to the unexecuted write commands using Redundant Array of Independent Disks (RAID) or erasure codes. Host 110 may then re-write the data payloads that correspond to the one or more unexecuted write commands in non-volatile memory devices 160a-h.

In some embodiments, host 110 may do nothing in response to receiving the retrieved list of one or more unexecuted write commands. In the event that the data associated with the one or more unexecuted write commands is subsequently attempted to be read, host 110 may return an error. In some embodiments, in response to the read error, host 110 may request the data payload corresponding to the requested, unexecuted write command from redundant storage, or may re-write the data payload after reconstructing the data payload from RAID or erasure code, or any other suitable method of data retrieval/reconstruction.

Figure 2:
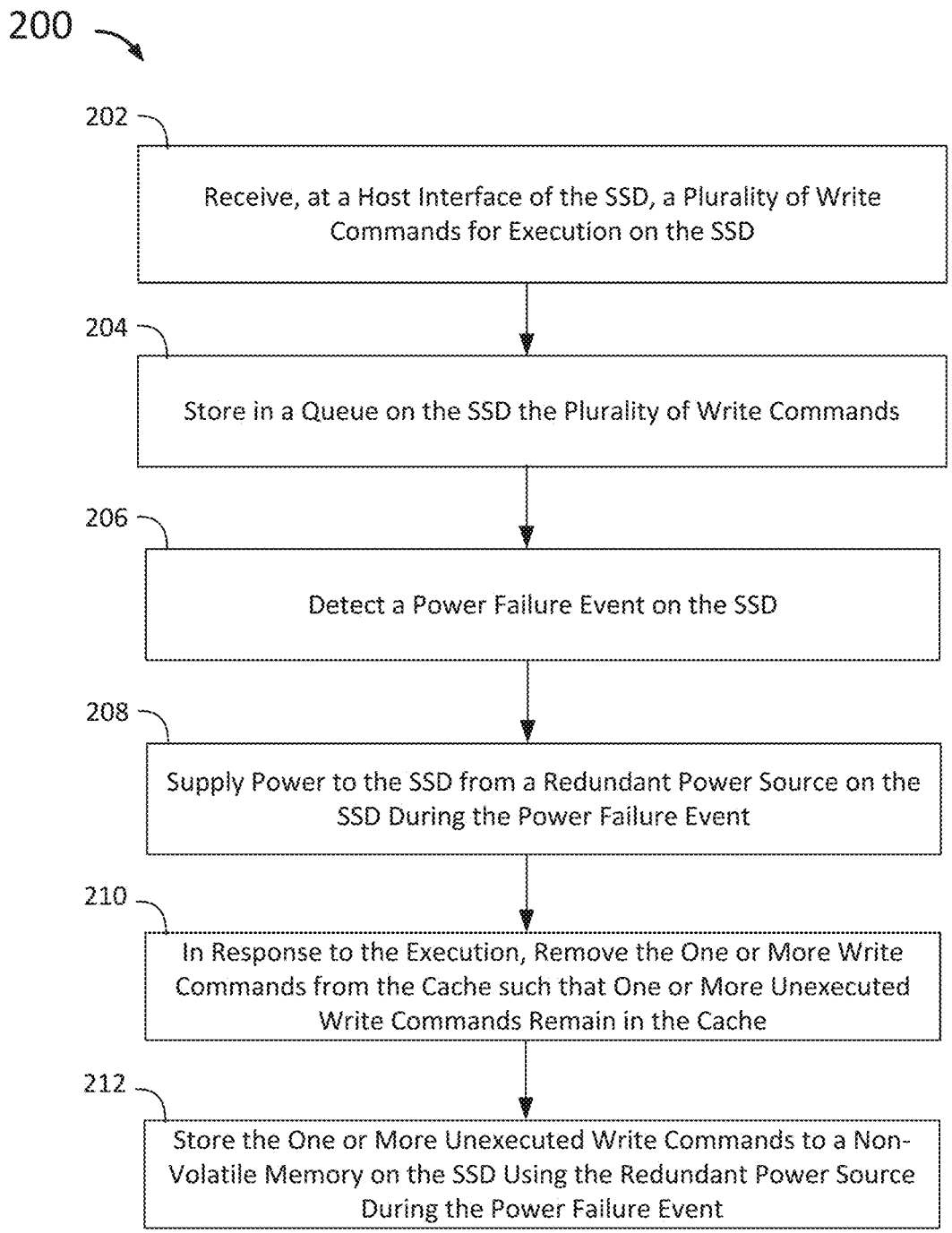
FIG. 2 is a flowchart of a method for managing reduced power failure energy requirements in a solid state drive.

FIG. 2 is a flowchart of a method for managing the reduced power failure energy requirements, according to some implementations of the invention. Process 200 begins at step 202, where memory controller 130 receives, at host interface 120 of solid state drive 100, a plurality of write commands for execution on solid state drive 100. At step 204, memory controller 130 stores, in a cache on solid state drive 100, the plurality of write commands. For example, memory controller 130 may store the plurality of write commands in cache 132 in volatile memory 130 and may transmit acknowledgements for each write command in the plurality of write commands for execution.

At step 206, memory controller 130 detects a power failure event on solid state drive 100. For example, memory controller 130 may detect a power failure event on solid state drive 100 by detecting a loss of power from a change in the voltage and/or current provided to solid state drive 100 from main power 170. At step 208, DC power regulation and distribution 180 supplies power to solid state drive 100 from a backup power source (e.g., backup power 182) on solid state drive 100 during the power failure event. For example, DC power regulation and distribution 180 supplies power from backup power 182 to solid state drive 100 during the power failure event.

At step 210, in response to the execution, memory controller 130 removes the one or more write commands from the cache such that one or more unexecuted write commands remain in the cache. For example, memory controller 130 removes the one or more executed write commands from cache 132 after the corresponding data payloads have been written into non-volatile memory devices 160a-h. The unexecuted write commands remain in cache 132 waiting to be processed. At step 212, memory controller 130 stores the remaining one or more unexecuted write commands, but not their data payloads, to non-volatile memory devices 160a-h on solid state drive 100 using the backup power source during the power failure event. For example, memory controller 130 stores the parameters associated with the unexecuted write commands to non-volatile memory devices 160a-h on solid state drive 100 before backup power 182 is fully depleted. The data payloads associated with these commands remaining in cache 132 are therefore lost when backup power 182 is fully depleted, but may be reconstructed or restored from redundant sources as described previously.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

The listing of the claims:

1. A method for controlling a solid state drive (SSD) in response to a power failure event of a main power supply to the SSD, comprising:
   receiving, at a host interface of the SSD, a plurality of write commands and associated data payloads for execution on the SSD;
   storing in a volatile memory on the SSD the plurality of write commands and the associated data payloads;
   detecting the power failure event on the SSD;
   supplying power to the SSD from a backup power source on the SSD during the power failure event;
   executing one or more write commands stored in the volatile memory by storing the associated data payloads of the one or more write commands in a non-volatile memory on the SSD using the backup power source during the power failure event;
   in response to the execution, removing the one or more write commands from the volatile memory such that one or more unexecuted write commands and the associated data payloads remain in the volatile memory; and
   storing a list of the one or more unexecuted write commands, but not the associated data payloads, in the non-volatile memory on the SSD using the backup power source during the power failure event.

2. The method of claim 1, further comprising:
   determining a first quantity of the plurality of write commands capable of being executed using a redundant power source during the power failure event, wherein a second quantity of the one or more write commands executed corresponds to the first quantity.

3. The method of claim 1, wherein each of the one or more unexecuted write commands comprise at least one of: a destination logical block address and a number of logical blocks to be written addresses, a list of destination logical block addresses and a position, in a submission cache in the volatile memory.

4. The method of claim 3, further comprising:
   in response to receiving power from the main power supply following the power failure event, reading the list of the one or more unexecuted write commands from the non-volatile memory and marking, in a logical to physical mapping table, the destination logical block addresses of the one or more unexecuted write commands as invalid.

5. The method for managing reduced power failure energy requirements on the SSD of claim 1, further comprising:
   transmitting to the host interface the list of the one or more unexecuted write commands stored in the non-volatile memory on the SSD, in response to receiving power from the main power supply following the power failure event.

6. The method of claim 5, further comprising:
   receiving, via the host interface, a read command; and
   determining whether the read command requests data corresponding to a data payload associated with an unexecuted write command in the list of the one or more unexecuted write commands.

7. The method of claim 6, further comprising:
   in response to determining that the read command requests the data corresponding to the data payload associated with the unexecuted write command, sending an error message to the host interface.

8. The method of claim 1, further comprising:
   receiving at the host interface a request for the list of the one or more unexecuted write commands stored in the non-volatile memory on the SSD; and
   transmitting the list of the one or more unexecuted write commands to the host interface.

9. The method of claim 1, wherein a quantity of the plurality of write commands stored in the volatile memory is higher than a quantity of write commands capable of being executed by the SSD using the backup power source.

10. The method of claim 1, wherein the backup power source is a finite power source.

11. A system for controlling a solid state drive (SSD) in response to a power failure event of a main power supply to the SSD, the SSD comprising:
   a controller;
   a backup power source, configured to supply power to the SSD during the power failure event;
   a non-volatile memory;
   a volatile memory;
   a host interface;
   the controller configured to:

receive, at the host interface, a plurality of write commands and associated data payloads for execution;

store, in the volatile memory, the plurality of write commands and associated data payloads;

detect the power failure event;

wherein, following detection of the power failure event, the controller configured to:

execute one or more write commands stored in the volatile memory by storing the associated data payloads of the one or more commands in the non-volatile memory;

in response to the execution, remove the one or more write commands from the volatile memory such that one or more unexecuted write commands and associated data payloads remain in the volatile memory; and store a list of the unexecuted one or more write commands, but not the associated data payloads, in the non-volatile memory.

12. The system of claim 11, wherein the controller is further configured to determine a first quantity of the plurality of write commands capable of being executed using a redundant power source during the power failure event, wherein a second quantity of the one or more write commands executed corresponds to the first quantity.

13. The system of claim 11, wherein the one or more unexecuted write commands comprise at least one of: a destination logical block address, a number of logical blocks to be written, a list of logical block addresses and numbers of blocks to be written, and a position, in a submission cache in the volatile memory.

14. The system of claim 13, wherein the controller is further configured to:

in response to receiving power from the main power supply following the power failure event, read the list of the one or more unexecuted write commands from the non-volatile memory; and mark, in a logical to physical mapping table, the at least one of a destination logical block address of the one or more unexecuted write commands as invalid.

15. The system of claim 14, wherein the controller is further configured to:

transmit, to the host interface the list of the one or more unexecuted write commands.

16. The system of claim 15, wherein the controller is further configured to:

receive a read command request from the host interface; and determine whether the read command requests data corresponding to a data payload associated with an unexecuted write command in the one or more unexecuted write commands.

17. The system of claim 16, wherein the controller is further configured to, in response to determining that the read command requests the data corresponding to the data payload associated with the unexecuted write command, send an error message to the host interface.

18. The system of claim 11, wherein a quantity of the plurality of write commands stored in the volatile memory is higher than a quantity of write commands capable of being executed by the SSD using the backup power source.

19. The system of claim 11, wherein the backup power source is a finite power source.

* * * * *